(12) United States Patent
Suda

(10) Patent No.: US 7,707,353 B2
(45) Date of Patent: Apr. 27, 2010

(54) ACCESS FREQUENCY ESTIMATION APPARATUS AND ACCESS FREQUENCY ESTIMATION METHOD

(75) Inventor: Takaya Suda, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 265 days.

(21) Appl. No.: 11/757,053

(22) Filed: Jun. 1, 2007

(65) Prior Publication Data

US 2008/0005452 A1    Jan. 3, 2008

(30) Foreign Application Priority Data

Jun. 8, 2006    (JP) .............................. 2006-160082

(51) Int. Cl.
*G06F 12/00* (2006.01)
(52) U.S. Cl. ............... 711/103; 711/112; 711/E12.008; 365/185.33; 365/185.29; 365/185.08; 365/185.3
(58) Field of Classification Search .................. 711/103
See application file for complete search history.

(56) References Cited

U.S. PATENT DOCUMENTS 5,819,307 A * 10/1998 Iwamoto et al. ............. 711/103
6,831,865 B2 * 12/2004 Chang et al. ............ 365/185.33
7,467,253 B2 * 12/2008 Yero .......................... 711/103
2003/0196029 A1 * 10/2003 Komatsu et al. ............ 711/103
2004/0151031 A1 *  8/2004 Tanaka ................... 365/185.29
2007/0208904 A1 *  9/2007 Hsieh et al. ................. 711/103

FOREIGN PATENT DOCUMENTS

JP         6-52694          2/1994

* cited by examiner

*Primary Examiner*—Reginald G Bragdon
*Assistant Examiner*—Arvind Talukdar
(74) *Attorney, Agent, or Firm*—Oblon, Spivak, McClelland, Maier & Neustadt, L.L.P.

(57) ABSTRACT

An apparatus for estimating a frequency of access to a storage device that includes a flash memory and a controller for controlling the flash memory includes interface. Data is written into the flash memory in units of a page and being erased from the flash memory in units of a block consisting of pages. The interface is supplied with an internal signal transferred between the flash memory and the controller, configured to recognize the internal signal, and outputs the internal signal as an input signal. An erasure sequence detection section outputs a detection signal when address data is followed by an erasure command requesting erasure of data in the block specified by the address data in the input signal. An address holding section holds address data in the internal signal, and outputs held address data as erasure address data when supplied with the detection signal.

11 Claims, 5 Drawing Sheets

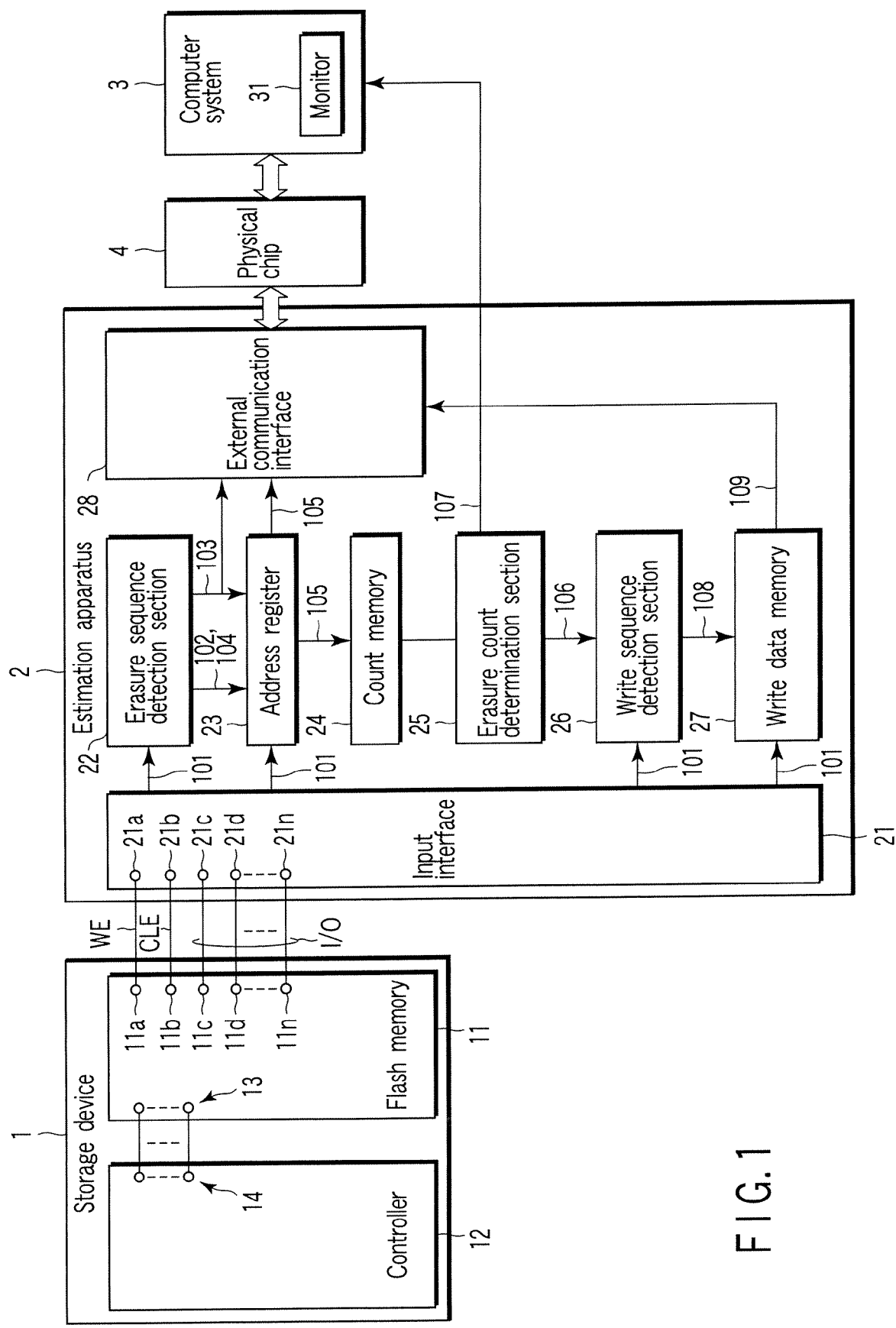
F I G. 1

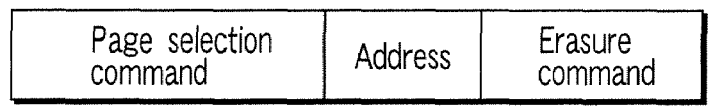
FIG. 2
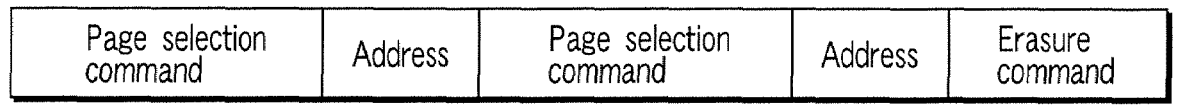
FIG. 3
| Block number | Erasure count |
|---|---|
| 1 | 3 |
| 2 | 5 |
| 3 | 2 |
| n | 5 |
FIG. 4

ACCESS FREQUENCY ESTIMATION APPARATUS AND ACCESS FREQUENCY ESTIMATION METHOD

CROSS-REFERENCE TO RELATED APPLICATIONS

This application is based upon and claims the benefit of priority from prior Japanese Patent Application No. 2006-160082, filed Jun. 8, 2006, the entire contents of which are incorporated herein by reference.

BACKGROUND OF THE INVENTION

1. Field of the Invention

The present invention relates to an access frequency estimation apparatus and an access frequency estimation method and, for example, to an apparatus and a method for estimating a frequency of access to a semiconductor storage device for each predetermined region.

2. Description of the Related Art

A high voltage is applied to each of memory cells of a flash memory at an insulating film constituting the memory cell when data is written to the memory cell. An accumulation of application of the high voltage deteriorates the characteristics of the insulating film. An accumulation of deterioration of the characteristics of the insulating film lowers reliability of the memory cell in retaining data. Accordingly, each memory cell has an upper limit of the number of rewritable times.

If writing is concentrated at a certain memory cell, the count of writing data to this memory cell reaches the upper limit earlier than the other memory cells. As a result, reliability of data retention of the whole flash memory is lowered. In order to avoid such a situation, it is desirable that the count of writing data to the memory cells be as even as possible in the entire memory cells.

In order to meet such requirements, most of controllers for controlling a flash memory try to level the count of writing as much as possible in all the memory cells wear leveling).

A flash memory controller for controlling a flash memory is generally composed of hardware for controlling a bus of the flash memory and software for controlling an operation of the hardware. The software performs the wear leveling.

It is necessary to verify whether the software of the flash memory controller performs appropriate wear leveling at the designing stage of the flash memory controller. As the verification methods, the following two methods are so far possible.

A first method involves visual verification of a flowchart representing an operation of the software, and confirming whether the hardware operates in accordance with the flowchart by means of a simulator or the like. The first method does not verify an actual operation of the flash memory controller upon a write operation. As a result, the method cannot find a defect in wear leveling resulting from an unpredictable problem that cannot be found by the flowchart and simulation. Furthermore, the method includes confirmation performed by a human being, resulting in possible mistakes.

A second method involves actual verification of signals on a bus of the flash memory manufactured on an experimental basis. A general-purpose measuring instrument such as a logic analyzer is used because a protocol analyzer exclusively used for a flash memory to detect a command or the like peculiar to the flash memory is not commercially available so far. A logic analyzer outputs signals on the bus, which is an object to be verified, at appropriate intervals, and numerating the signals, for example, on an image along the time base.

However, as described above, since the general-purpose logic analyzer cannot recognize a command peculiar to the flash memory, and thus it takes in the state (for example, "0" or "1") of each signal at each point of time. Further, it is necessary to extract write commands and write addresses from the acquired data to analyze the write commands and the write addresses. Thus, the data to be taken in and stored and the resulting throughput are enormous. Accordingly, it is impossible to actually carry out the second method.

Jpn. Pat. Appln. KOKAI Publication No. 6-52694 discloses monitoring signals transferred to or from a flash memory from or to a memory controller, and measuring a period of time from a data erasure command, with data erasure completion or incompletion, to data erasure completion.

BRIEF SUMMARY OF THE INVENTION

According to an aspect of the present invention, there is provided an apparatus for estimating a frequency of access to a storage device, the device including a flash memory and a controller for controlling the flash memory, data being written into the flash memory in units of a page and being erased from the flash memory in units of a block consisting of pages, the apparatus comprising: interface supplied with an internal signal transferred between the flash memory and the controller, being configured to recognize the internal signal, and outputting the internal signal as an input signal; an erasure sequence detection section outputting a detection signal when address data is followed by an erasure command requesting erasure of data in the block specified by the address data in the input signal; and an address holding section holding address data in the internal signal, and outputting held address data as erasure address data when supplied with the detection signal.

According to an aspect of the present invention, there is provided a method for estimating a frequency of access to a storage device, the device including a flash memory and a controller for controlling the flash memory, data being written into the flash memory in units of a page and being erased in units of a block consisting of pages from the flash memory, the method comprising: acquiring an internal signal transferred between the flash memory and the controller; holding address data in the internal signal; detecting an event that the address data is followed by an erasure command requesting erasure of data in a block specified by the address data in the internal signal; and outputting the held address data as erasure address data on detection of the event.

BRIEF DESCRIPTION OF THE SEVERAL VIEWS OF THE DRAWINGS

FIG. 1 is a block diagram showing an access frequency estimation apparatus according to an embodiment of the present invention.

FIG. 2 is a diagram showing a flow of a signal detected by the estimation apparatus according to the embodiment of the present invention.

FIG. 3 is a diagram showing a flow of a signal detected by the estimation apparatus according to the embodiment of the present invention.

FIG. 4 shows an example of data stored in a count memory.

DETAILED DESCRIPTION OF THE INVENTION

Figure 5:
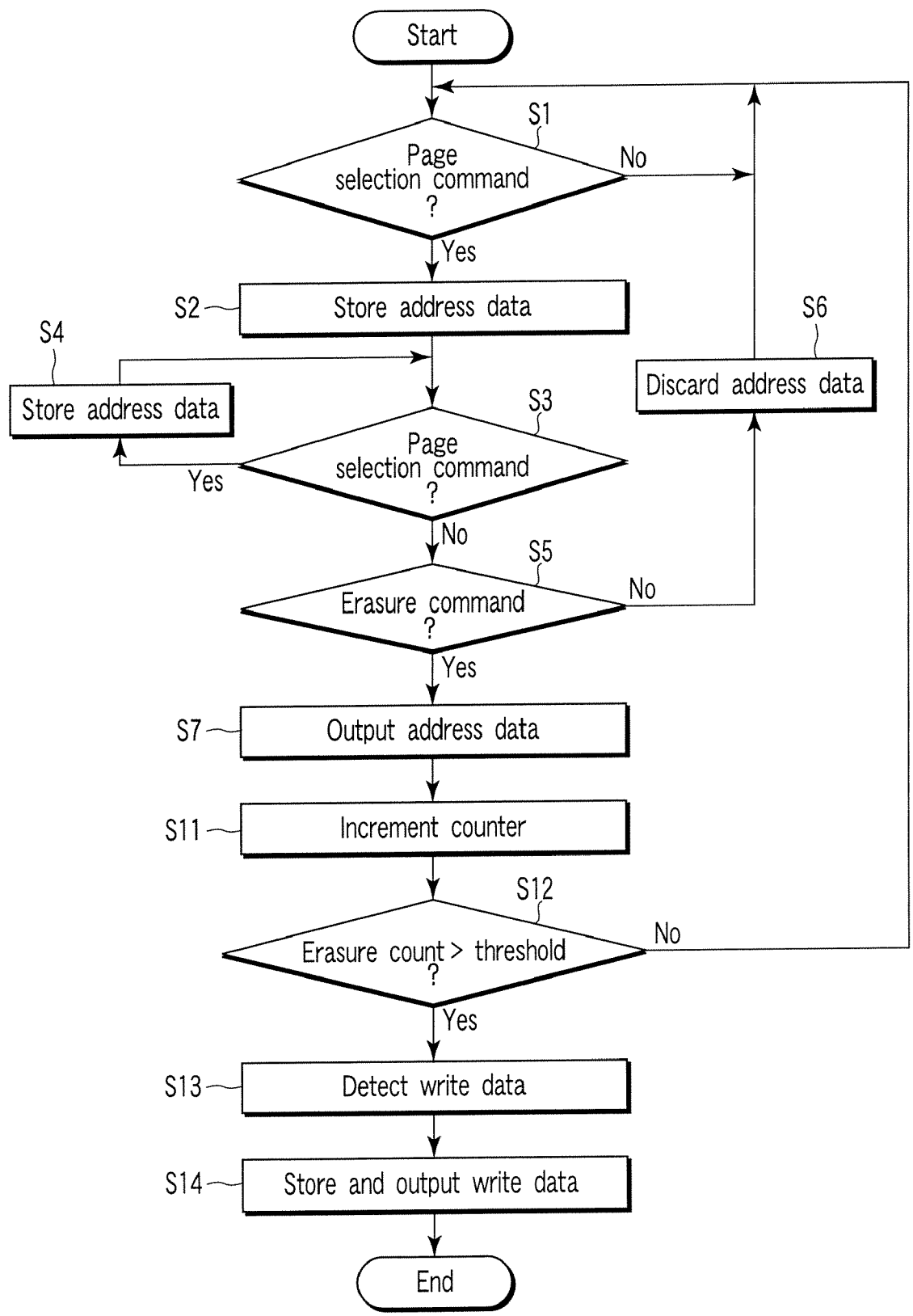
FIG. 5 is a flowchart showing operations of the access frequency estimation apparatus according to the embodiment of the present invention.

A NAND type flash memory stores data in units of a predetermined size storage area, which may be called a page. A page is composed of a predetermined number of memory cells and stores data of a quantity corresponding to the predetermined number. Accordingly, in order to estimate a frequency of writing to a storage device such as a memory card using a NAND type flash memory, the simplest way may be estimation of a frequency of writing data for each page. In this case, it is necessary to detect an address of each page and a write command to write data on the page of the address, and count and estimate the frequency of writing.

However, with an increase in the capacity of the NAND type flash memory, the number of pages has also increases. As a result, estimation of a frequency of access to each page requires to store a vast quantity of address data of pages into which data has been written. Therefore, this method is not so practical. On the other hand, the following method is possible.

This method utilizes a characteristic that the NAND flash memory prohibits overwriting on a page on which data has already been written and always writes data on a page from which data has already been erased. That is, in the NAND type flash memory, when data written on a page becomes out-of-date, the data on the page is erased and pages on which data is not written are prepared one after another. In other words, an erasure target page has been through writing before without any exception.

Further, in the flash memory, erasure of data written on a page can be performed only in units of a block, which is a congregation of pages. Accordingly, observing of a data erasure command to erase data can show that data has been written on pages included in the block. Since the capacity of a block is larger than that of a page, observing of a data erasure command to erase data of one block can estimate a frequency of writing data on each page by fewer processes and a small amount of address data.

An embodiment of the present invention configured on the basis of the above-mentioned view will be described below with reference to the accompanying drawings. In the following description, constituent elements having substantially the same function and structure are denoted by the same reference symbols and a duplicated description will be given only when necessary.

FIG. 1 is a functional block diagram showing an access frequency estimation apparatus according to an embodiment of the present invention. Each functional block can be realized as either one of hardware and software or a combination of both of them. Therefore, each block will be described below generally in view of functions so that it can be clear to which of the above items each block belongs. Whether such functions are implemented as hardware or software depends on a specific embodiment or design restrictions imposed on the entire system. Those skilled in the art can readily realize these functions by various methods for each specific embodiment. However, determination of such realization belongs to the category of the present invention.

In FIG. 1, a storage device 1, which is an object of estimation, includes a NAND type flash memory (hereinafter simply referred to as a flash memory) 11 and a controller 12. The flash memory 11 operates in accordance with a command and an address signal supplied thereto from the controller 12. Further, the flash memory 11 is configured such that data is written thereto in units of a page in which data of more than one bit is stored, and data is erased in units of a block consisting of more than one pages.

The controller 12 is supplied with a data read command, data write command, address of an object of read/write, and write data from a host device (not shown). The controller 12 instructs the flash memory 11 to perform write and read corresponding to the instructions.

The flash memory 11 and the controller 12 communicate with each other in conformity with an interface defined in accordance with the design of the flash memory 11. This interface (hereinafter referred to as an internal interface) stipulates various hardware-based and software-based elements necessary for the flash memory 11 and the controller 12 to communicate with each other. Any kind of interface can be used as such interface.

What the internal interface defines include, for example, definition of a command, a format of an address, size of a bus and data format for a command, an address and data transmission/reception, acquisition timing and order for a command, an address and data, chip enable signal, and ready/busy signal. Furthermore, in order to enable transmission/reception of a signal conforming to the internal interface, terminals (each corresponding to respective signals to be input and output from them) from which respective signals are to be input/output are also stipulated by the interface.

As shown in FIG. 1, terminals 13 of the flash memory 11 and terminals 14 of the controller 12 are electrically connected to each other to allow transmission/reception of a signal defined by the internal interface.

The internal interface will be described below by taking a certain concrete one as an example. However, the internal interface is not limited to the interface to be described below.

In the communication conforming to the internal interface used in the following description, at least a write enable signal (serving as a data sampling clock signal of the estimation apparatus) and an I/O signal of an appropriate number of bits (for example, 8 bits) are defined. Further, paths for these signals, i.e., a write enable signal line and I/O line are formed between the flash memory 11 and the controller 12.

The write enable signal WE is transferred on the write enable signal line. The write enable signal has the same function as a clock signal, and prescribes a timing at which I/O data I/O is to be acquired. For example, I/O data I/O obtained at rising or falling edges of the write enable signal is acquired by the flash memory 11.

The I/O data I/O includes a command, address data, data and the like. In, for example, a case where a command is transferred, 8 bits constituting the command are respectively transferred in parallel on eight signal lines constituting the I/O line.

The internal interface may include, for example, a command latch enable signal line. A command latch enable signal CLE controls an operation of acquiring I/O data I/O as a command. Specifically, while the command latch enable signal CLE is valid (for example, a high level), I/O data I/O is acquired at rising (or falling) edges of the write enable signal by the flash memory 11.

The NAND flash memory 11 further has n pieces (n is a natural number equal to or larger than 2) of signal output terminals 11a to 11n for inspection and estimation used at the time of development of the storage device 1. The signal output terminals 11a to 11n output the write enable signal WE and I/O data supplied to the flash memory 11 in accordance with the internal interface as they are. The number of n takes a value corresponding to a bit number or the like of the I/O line of the internal interface.

The access frequency estimation apparatus 2 is composed of, for example, an FPGA (field programmable gate array). Alternatively, the access frequency estimation apparatus 2 can be realized or implemented by any one of or all of combinations of a main processor, digital signal processor (DSP), programmable logic circuit, discrete gate or transistor, discrete hardware constituent element, all of which are designed so as to allow them to execute, for example, the functions described below.

The access frequency estimation apparatus 2 includes an input interface 21, erasure sequence detection section 22, address register 23, count memory 24, erasure time number determination section 25, write sequence detection section 26, write data memory 27, and external communication interface 28.

The input interface 21 is composed of software and hardware so that it can receive and recognize a signal supplied to the flash memory in accordance with the internal interface described above. Typically, the input interface 21 has at least the same structure as a part of the structure for realizing the internal interface provided in the flash memory 11.

As for a hardware structure, the interface 21 includes at least signal input terminals 21a to 21n. The respective signal input terminals 21a to 21n are designed as to receive signals output from the signal output terminals 11a to 11n. When the storage device 1 is to be estimated, the signal output terminals 11a to 11n are electrically connected to the signal input terminals 21a to 21n, respectively, by means of appropriate conductive lines.

The erasure sequence detection section 22 is supplied with at least a write enable signal, I/O data, and command latch enable signal from the input interface 21. Hereinafter, these signals are collectively referred to as a signal (input signal) 101. The erasure sequence detection section 22 monitors I/O data and detects a predetermined pattern consisting of a predetermined command and address data.

More specifically, the erasure sequence detection section 22 detects, for example, a flow of signals in the I/O data shown in FIG. 2 or 3. FIGS. 2 and 3 respectively show a flow of signals to be detected by the estimation apparatus according to the embodiment of the present invention. As shown in FIG. 2, the erasure sequence detection section 22 detects an erasure command that follows one or more pairs of a page selection command and a subsequent address signal.

The flash memory 11 may support erasure of more than one blocks by one erasure command after selecting these blocks. For that purpose, a page erasure command is issued in some cases after address data is supplied. In such cases, an erasure command that follows two or more sets of a page selection command and a subsequent address signal is detected as shown in FIG. 3.

As shown in FIG. 1, upon detection of the page selection command, the erasure sequence detection section 22 supplies a signal 102 instructing to store data of an address subsequent to the page selection command to the address register 23. Upon detection of an erasure command, furthermore, the erasure sequence detection section 22 outputs a detection signal 103.

On the other hand, when a command subsequent to the address data in the I/O data is not an erasure command, the erasure sequence detection section 22 outputs a signal 104 instructing discarding of the stored address data.

The address register 23 is supplied with the input signal 101 from the input interface 21. Upon reception of the signal 102 from the erasure sequence detection section 22, the address register 23 temporarily stores the address data in the I/O data. Further, when supplied with the signal 103, the address register 23 outputs an address data signal 105 including the stored address data. Furthermore, upon being supplied with a signal 104, the address register 23 discards the stored address data.

The count memory 24 consists of a memory such as an static random access memory (SRAM). The count of becoming erasure target of the flash memory 11 is stored in the count memory 24 for each block of the flash memory 11 in the form shown in, for example, FIG. 4. More specifically, when the address data signal 105 is supplied to the count memory 24, the count of erasure of a block specified by an address indicated by the address data signal 105 is incremented by one, and the incremented value is stored.

The erasure count determination section 25 monitors the count memory 24 at all times, and detects a block that has been an erasure target for number of times over a predetermined threshold. The erasure count determination section 25 outputs an address data signal 106 specifying the block that has been an erasure target for more-than-threshold count. The erasure count determination section 25 also outputs a signal 107 indicative detection of the block that has become erasure target for more-than-threshold count.

The write sequence detection section 26 is supplied with the input signal 101 and the address data signal 106. Upon reception of the address data signal 106, the write sequence detection section 26 starts monitoring of the input signal 101. The write sequence detection section 26 detects write commands to write data in all the pages included in the block specified by the address data signal 106. Further, the write sequence detection section 26 outputs a signal 108 instructing of acquiring write data flowing subsequently to such a write command.

The write data memory 27 is composed of, for example, an SRAM, and supplied with a data acquisition instruction signal 108. Upon reception of the data acquisition instruction signal 108, the write data memory 27 stores write data specified by this signal, and outputs data and data output instruction signal 109 including the write data and an instruction to output the write data.

The external communication interface 28 is supplied with the detection signal 103, address signal 105, data and data output instruction signal 109. Upon reception of the detection signal 103, the external communication interface 28 starts preparation for communication with the outside of the access frequency estimation apparatus 2. Further, the external communication interface 28 converts the address signal 105, data and data output instruction signal 109 into a format complying with a communication standard such as the universal serial bus (USB) and RS232C that connects the access frequency estimation apparatus 2 and a computer system 3 so as to allow them to communicate with each other. Furthermore, the external communication interface 28 converts a signal sent from the computer system 3 into a format which can be recognized by the access frequency estimation apparatus 2. The external communication interface 28 can be realized by, for example, a commercially available chip.

The external communication interface 28 is electrically connected to a physical chip 4. The physical chip 4 is provided inside or outside the access frequency estimation apparatus 2, includes terminals or the like of a format complying with the employed interface, and can be realized by, for example, a commercially available chip.

The computer system 3 is connected to the access frequency estimation apparatus 2 by a cable such as a USB cable and RS232C cable so as to allow them to communicate with each other. The computer system 3 processes output data from the access frequency estimation apparatus 2.

Next, operations of the access frequency estimation apparatus having the structure shown in FIG. 1 will be described below with reference to FIGS. 1 and 5. FIG. 5 is a flowchart showing the operations of the access frequency estimation apparatus according to the embodiment of the present invention.

As shown in FIG. 5, when the estimation is started, the input interface 21 monitors the input signal 101 at all times, and detects a page selection command (step S1). Specifically, the input interface 21 monitors the I/O data and recognizes the page selection command while monitoring the command latch enable signal. The operation of step S1 is repeated unless the page selection command is detected.

When the condition of step S1 is satisfied, the erasure sequence detection section 22 supplies the address storing instruction signal 102 to the address register 23. Upon reception of the address storing instruction signal 102, the address register 23 stores address data subsequent to the page selection command in the I/O data included in the input signal 101 (step S2).

Note that when the number of bits of an address of a page is more than the number of bits of the I/O line, appropriately-divided parts of an address data are supplied onto the I/O line one after another. For example, when the I/O line is of 8 bits and the address is constituted by 24 bits as described above, a part of the address signal of 8 bits divided into three sections flows serially three times on the I/O line.

In order to acquire a command specifying processing for address data which flows after the page selection command, the estimation apparatus 2 monitors the I/O data again after storing the address data.

When the flash memory 11 supports erasure, reading, and the like of more than one blocks, a page selection command may be issued subsequently to supply of address data. When a page selection command is issued again after the address data is supplied to the erasure sequence detection section 22 (step S3), the erasure sequence detection section 22 supplies the signal 102 instructing the address register 23 to store the address data subsequent to the page selection command. Upon reception of this signal, the address register 23 stores the address signal subsequent to the second page selection command (step S4).

Incidentally, erasure is carried out in units of a block as described above, and designation of a block to be erased is performed by specifying a leading page of the block.

Thereafter, the erasure sequence detection section 22 monitors the input signal 101, and operations of steps S3 and S4 are repeated. When a page selection command and address signals are issued, the address signals are acquired one after another.

The erasure sequence detection section 22 continues monitoring the command (step S5). When the detected command is not an erasure command, the flow moves to step S6. Commands other than the erasure command may be a read command, page copy command or the like. In this case, since one or more stored addresses are not used for erasure, they are no longer necessary in the estimation method that requires specification of erasure target pages. Accordingly, the erasure sequence detection section 22 supplies an address discard instruction signal 104 instructing the address register 23 to discard the stored address data in step S6. Upon reception of the address discard instruction signal 104, the address register 23 erases the address data that has so far been stored.

On the other hand, when an erasure command is found as a result of the determination performed in step S5, it means that addresses acquired so far are objects to be erased. Accordingly, when an erasure command is issued subsequently to the address data, the erasure sequence detection section 22 outputs a detection signal 103 to the address register 23 and the external communication interface 28.

Upon reception of the detection signal 103, the address register 23 outputs the stored addresses to the count memory 24 and the external communication interface 28 as an address data signal 105 (step S7). At the same time, further, upon reception of the detection signal 103, the external communication interface 28 converts the address data signal 105 that has subsequently been supplied thereto into a signal of a format conforming to the interface and enabling mutual communication between the estimation apparatus 2 and the computer system 3. Further, the external communication interface 28 outputs the converted signal to the computer system 3 in conformity with the interface.

Figure 6:
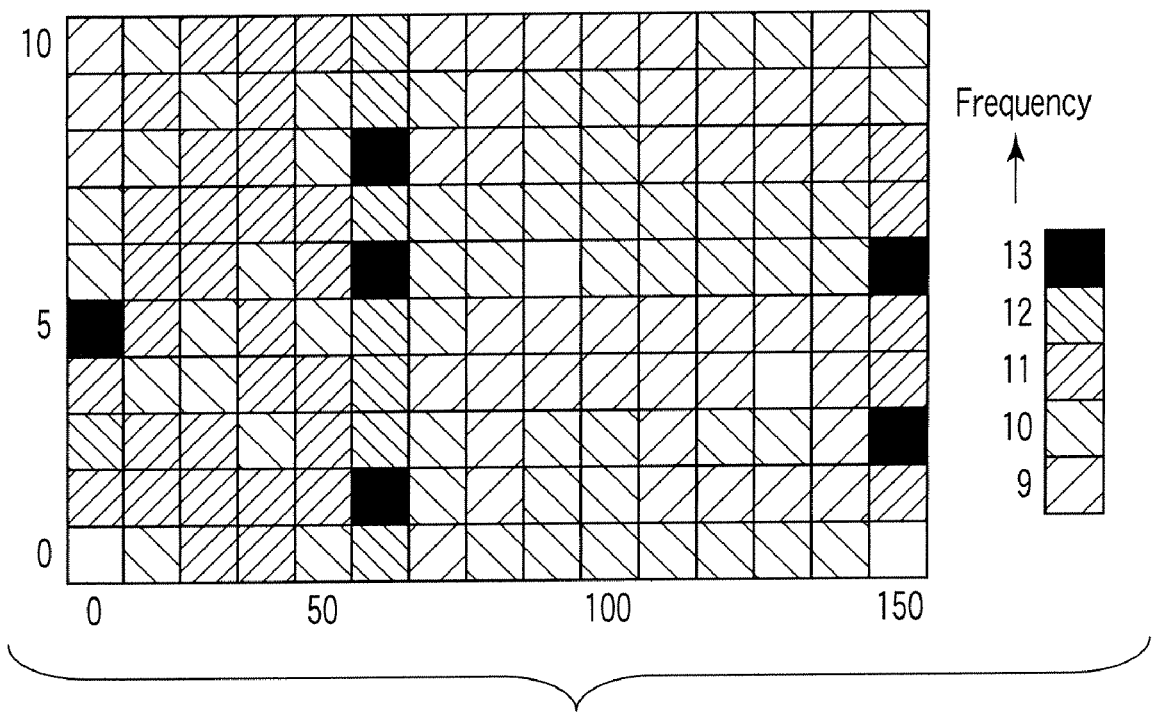
FIG. 6 shows a display example an output result of the access frequency estimation apparatus according to the embodiment of the present invention.

The computer system 3 counts the supplied address data signals, for example, for each block, and displays the results on, for example, a monitor 31 connected to the computer as a table. FIG. 6 shows a display example of the output results of the access frequency estimation apparatus 2. In FIG. 6, each square corresponds to a block. Accordingly, the number of squares equals to the number of blocks of the flash memory 11. The abscissa in FIG. 6 indicates the first two of three digits of block numbers, and the ordinate indicates the last one of the three digits of the block numbers.

As shown in FIG. 6, the count of erasure for each block is displayed. As a result, distribution of the count of blocks for erasure target can be visually grasped, whereby it can be easily determined whether blocks erasure is concentrated and wear leveling is appropriately performed.

Note that, in FIG. 6, the frequency of erasure targets for each block is shown by means of differences in hatched pattern. Needless to say, however, the frequency can be expressed by means of differences in color.

Furthermore, when only the access frequency is to be estimated, after the operation in step S7 in FIG. 5, the flow returns to step S1 to continue detection of a block to be erased. Then, the estimation is terminated at an arbitrary timing determined by the user of the estimation apparatus 2.

On the other hand, access frequency estimation apparatus 2 can also be adapted to automatically detect blocks which have been erasure target for the number of times more than a predetermined number. This will be subsequently described below with reference to FIGS. 1 and 5.

In step S7, the address register 23 supplies an address data signal 105 of an address of a erasure target page (block) to the count memory 24. Upon reception of the address data signal 105, the count memory 24 increments a counter indicating the count for the address specified by the address data signal 105, and saves the value of the counter (step S11).

The erasure count determination section 25 monitors the count memory 24 at all times. Further, The erasure count determination section 25 detects an address that has been a erasure target for number of times equal to or more than preset number (threshold) of times (step S12). A user of the estimation apparatus 2 can input the preset number to feed the number to the erasure count determination section 25 via the external communication interface 28.

When no address that has reached the preset number of times is detected, the flow returns to step S1.

On the other hand, when an address that has reached the preset number of times is detected, the flow moves to step S13. In step S13, the write sequence detection section 26 starts detecting a write command and write data relative to all the pages (pages to be acquired) included in a block specified by an address that has reached the preset number of times.

Upon detection of a write command relative to the page to be acquired, the write sequence detection section 26 supplies a signal 108 to request the write data memory 27 to acquire write data to be written on this page. Upon reception of this signal, the write data memory 27 stores the write data, and supplies the external communication interface 28 with the write data and a signal 109 indicative of instructions to output the write data to the outside of the access frequency estimation apparatus 2 (step S14).

Upon reception of the write data and the data output instruction signal 109, the external communication interface 28 converts the format and the like of the write data into a signal format conforming to the external communication interface 28, and outputs the resultant data to the computer system 3.

Thereafter, the computer system 3 can analyze the supplied write data to learn what kind of data (actual data, control data) is written and which block is frequently target of writing. Furthermore, the computer system 3 can perform debugging of the software (firmware) of the controller 11 on the basis of the analysis result.

Further, The erasure count determination section 25 may output the detection signal 107 when a block is found to be a erasure target for number of times more than predetermined number. It is also possible that the detection signal 107 is supplied to, for example, the computer system 3, and the computer system 3 receives the signal 107 so as to stop the operation of the controller 12 of the storage device 1. Successively acquiring signals transferred between the flash memory 11 and the controller 12 by a logic analyzer can analyze the state of the signals transferred between the flash memory 11 and the controller 12 before and after the detection of a block that has been an erasure object for number of times more than preset number of times. This enables easy analyze of faults of the software (firmware) of the controller 12.

Figure 7:
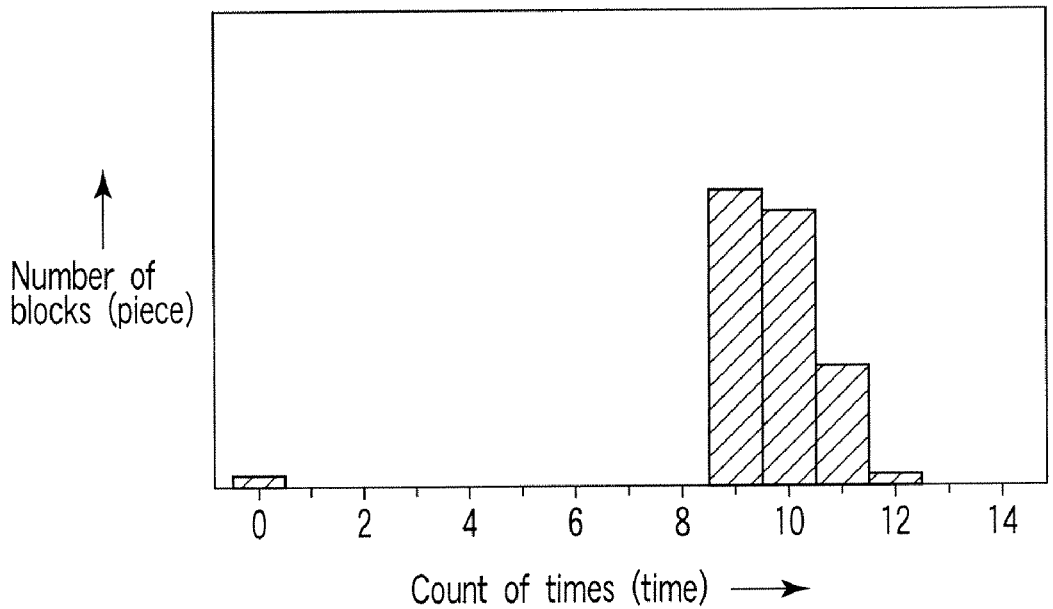
FIG. 7 is shows a result of an estimation experiment of a flash memory obtained by using the estimation apparatus according to the embodiment of the present invention.
Figure 8:
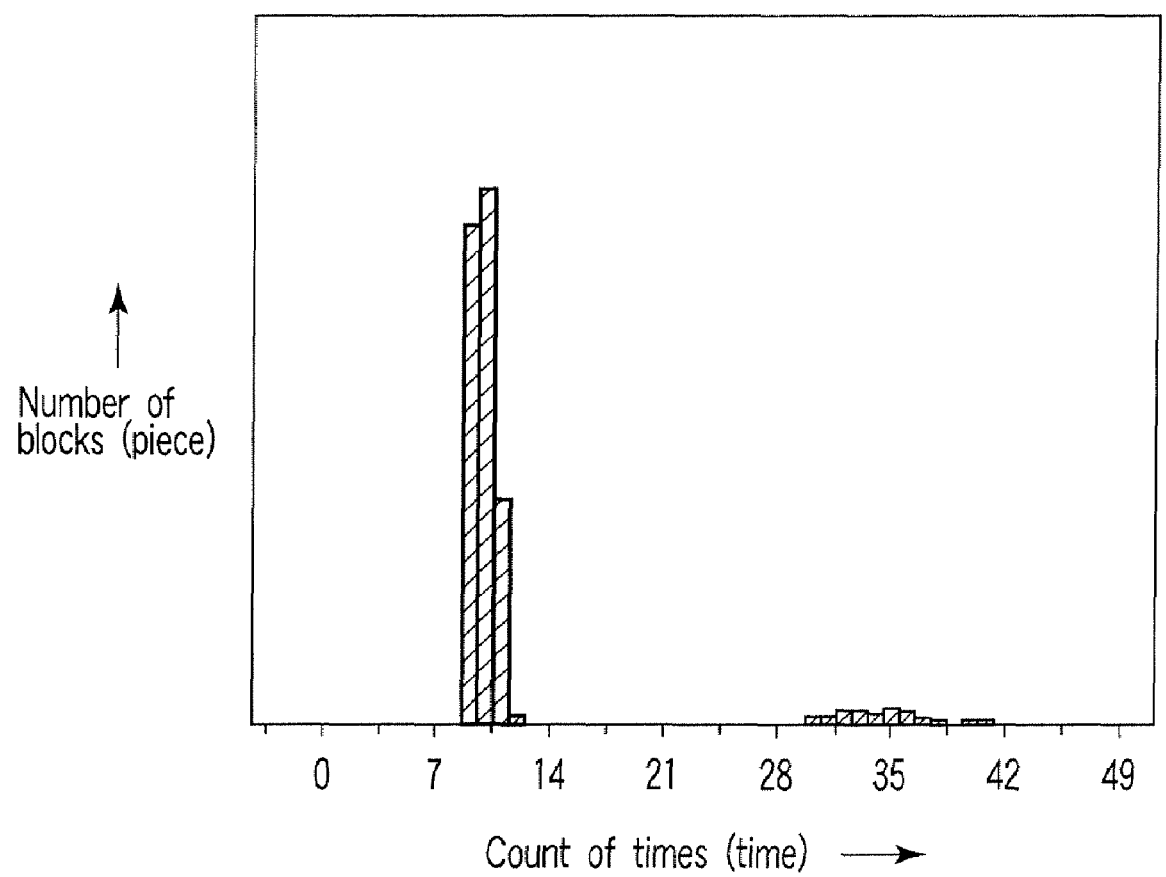
FIG. 8 shows a result of an estimation experiment of a flash memory obtained by using the estimation apparatus according to the embodiment of the present invention.

Next, experimental data obtained by the estimation apparatus having the structure described above and the estimation method will be described below. FIGS. 7 and 8 show the results of an estimation experiment of a flash memory obtained by using the estimation apparatus according to the present invention. An object of the experiment is a memory card containing a flash memory having a capacity of 1 GB. The experiment was carried out by estimating the frequency of block erasure performed while a file of 950 MB was copied ten times on Microsoft Windows (registered trade mark) XP.

In FIG. 7, the abscissa indicates the count for which a block has been an erasure target, and the ordinate indicates the count of blocks that have been an erasure target. In the erasure control shown in FIG. 7, it can be seen that all the blocks have been an erasure target substantially the same count. Specifically, it can be seen that a deviation for the erasure count of 9.6 times is 1.5 times. It can be seen from the above result that the blocks are uniformly used.

On the other hand, FIG. 8 shows an estimation result of a case where erasure is controlled to be concentrated at a specific block. As shown in FIG. 8, it can be seen that while many of the blocks have been erased a substantially equal count (8 to 11 times), few blocks have been erased for number of times largely exceeding the average number of times.

The data shown in FIGS. 7 and 8 have been obtained within the same period of time as the data write time, i.e., the data have been obtained in real time with respect to the operation of the storage device. That is, it has been confirmed that the amount of data requiring processing is small, and thus estimation has been achieved quickly.

According to the estimation apparatus of the embodiment of the present invention, a minimum necessary number and amount of commands and address data needed to estimate a frequency of access to the flash memory are extracted from various data items supplied from the flash memory controller to the flash memory. As a result, the access frequency can be estimated within a short period of time with a small-scale apparatus at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for estimating a frequency of access to a storage device, the apparatus to be connected to the storage device from the outside of the storage device, the device including a flash memory and a controller for controlling the flash memory, data being written into the flash memory in units of a page and being erased from the flash memory in units of a block consisting of pages, the apparatus comprising: an interface configured to be supplied with an internal signal transferred between the flash memory and the controller, being configured to recognize the internal signal, and outputting the internal signal as an input signal, the interface to be connected to the storage device from the outside of the device, wherein the interface is configured to be connected to terminals of the flash memory from which the flash memory outputs a signal that is identical to the internal signal that is transferred between the flash memory and the controller;

an erasure sequence detection section configured to output a detection signal when address data is followed by an erasure command requesting erasure of data in the block specified by the address data in the input signal;

an address holding section configured to hold address data in the internal signal, and to output, to an external communication interface, the held address data as erasure address data when supplied with the detection signal.

2. The apparatus according to claim 1, further comprising the external communication interface, which is configured to output, to the outside of the apparatus, the erasure address data whose format is changed.

3. The apparatus according to claim 1, wherein the sequence detection section is configured to request the address holding section to discard held address data on reception of a command other than the erasure command that follows the address data.

4. The apparatus according to claim 1, further comprising:
a count memory configured to be supplied with the erasure address data, and to store a count of reception of the erasure address data for each block; and
a determination section configured to monitor the count memory, and to output detection address data that identifies a block whose count on reception of erasure address data reaches a threshold.

5. The apparatus according to claim 4, wherein the determination section is configured to output, to the outside of the apparatus, a detection signal when the determination section detects a block whose count on reception of erasure address data reaches a threshold.

6. The apparatus according to claim 4, further comprising:
a write sequence detection section configured to be supplied with the detection address data, and to output, to a write data memory, a data acquisition instruction signal when a write command for each page included in a block specified by the detection address data is detected; and
the write data memory is configured to acquire and output, to the external communication interface, write data that follows the write command detected by the write sequence detection section when supplied with the data acquisition instruction signal.

7. A method for estimating a frequency of access to a storage device using an apparatus which is to be connected to the storage device from the outside of the storage device, the device including a flash memory and a controller for controlling the flash memory, data being written in into the flash memory units of a page and being erased in units of a block consisting of pages from the flash memory, the method comprising:
acquiring an internal signal transferred between the flash memory and the controller from an interface of the apparatus which is connected to the storage device from the outside of the storage device, wherein the interface is configured to be connected to terminals of the flash memory from which the flash memory outputs a signal that is identical to the internal signal that is transferred between the flash memory and the controller;
holding address data in the internal signal;
detecting an event that the address data is followed by an erasure command requesting erasure of data in a block specified by the address data in the internal signal; and
outputting, to an external communication interface, the held address data as erasure address data on detection of the event.

8. The method according to claim 7, further comprising discarding the held address data when a command other than the erasure command is detected subsequently to the address data.

9. The method according to claim 7, further comprising:
storing a count of outputting the erasure address data for each block; and
detecting a detection block whose count on reception of erasure address data reaches a threshold.

10. The method according to claim 9, further comprising outputting, to the outside of the apparatus, detection signal on detection of a block whose count on reception of erasure address data reaches a threshold.

11. The method according to claim 9, further comprising acquiring and outputting, to the external communication interface, write data that follows a write command for each page included in the detection block.

* * * * *